United States Patent

[11] 3,565,011

[72] Inventor: Lawrence K. Edwards
301 Santa Rita Ave., Palo Alto, Calif. 94301
[21] Appl. No. 727,197
[22] Filed May 7, 1968
[45] Patented Feb. 23, 1971

[54] HIGH-SPEED GROUND TRANSPORTATION SYSTEM
10 Claims, 4 Drawing Figs.

[52] U.S. Cl. .................................................. 104/138, 104/156
[51] Int. Cl. .................................................. B61b 13/10
[50] Field of Search ........................................ 104/138, 155, 156; 105/345

[56] References Cited
UNITED STATES PATENTS

| | | | |
|---|---|---|---|
| 2,488,287 | 11/1949 | Goddard | 105/345 |
| 3,090,328 | 5/1963 | Berggren | 104/138 |
| 3,100,454 | 8/1963 | Dennis | 104/138 |
| 3,213,802 | 10/1965 | Foa | 104/138 |
| 3,438,337 | 4/1969 | Edwards | 104/156 |

Primary Examiner—George E. Lowrance
Attorney—Koenig, Senniger, Powers and Leavitt ABSTRACT: A high-speed ground transportation system comprises a duct through which a vehicle is adapted for propulsion as a free piston. Entrance and exit valves are provided adjacent the ends of the duct and the section of the duct between the valves is preevacuated. On opening the entrance valve, air pressure forces the vehicle into the section and after the vehicle has passed the entrance valve, the latter is normally closed to trap a slug of air between the valve and the rear of the vehicle. This trapped slug of air expands to apply propulsive force to the rear of the vehicle, with attenuation of the air behind the vehicle and compression of the air ahead of the vehicle. The exit valve opens when the pressure ahead of the vehicle reaches a predetermined magnitude for passage of the vehicle through the exit valve and into a station. The present invention relates to means for assuring that the vehicle will stop in a station in the event that the entrance valve fails to close, or closes too early, or closes only partially. This is achieved by opening the exit valve and thereby repressurizing the duct ahead of the vehicle, and doing so at such a time as to match the future energy loss of the vehicle with that which is necessary to stop the vehicle in the station downstream from the exit valve.

HIGH-SPEED GROUND TRANSPORTATION SYSTEM

BACKGROUND OF THE INVENTION

The invention is particularly concerned with improvements in high-speed ground transportation systems of the type in which a vehicle is normally propelled as a free piston through a tube or duct by differential air pressure between the front and rear of the vehicle, such as are described in my copending U.S. Pat. applications Ser. Nos. 473,724 and 473,726, each filed Jul. 21, 1965, and each entitled High-Speed Ground Transportation System.

In my U.S. Pat. application Ser. No. 473,724, there is shown a high-speed ground transportation system comprising a duct, a vehicle adapted for propulsion as a free piston through the duct by differential air pressure on the rearward and forward ends of the vehicle, an entrance valve for the duct adjacent one end of the duct and an exit valve for the duct adjacent the other end of the duct, these valves being adapted when closed to block off a section of the duct from valve to valve. This section is evacuated prior to entry of a vehicle therein. The duct has end portions outward of the valves constituting air locks and stations which are open to the atmosphere. In normal operation, starting with the vehicle in a first station, the corresponding valve (serving as an entrance valve) is opened for propulsion of the vehicle therethrough and past the entrance valve by atmospheric pressure acting on the rear of the vehicle. The entrance valve is normally closed at a carefully determined time after the rearward end of the vehicle has passed thereby, so as to trap a slug of atmospheric air in the duct. This slug of air expands to continue to propel the vehicle through the duct until the pressure of air rearward and ahead of the vehicle is equalized. The vehicle then coasts forward under the kinetic energy built up therein, compressing air ahead of the vehicle. When the pressure of air ahead of the vehicle slightly exceeds atmospheric pressure, the exit valve opens and the vehicle passes through it to emerge from the duct into the station. The vehicle is brought to a stop in the station by atmospheric pressure, and the exit valve closes behind the vehicle. Auxiliary pneumatic means for vernier control of the stopping position of the vehicle in the station are provided, but this means is insufficient to stop the vehicle in the emergency conditions that are the main subject of the present invention.

Because of the great speed involved in the system described by my copending applications, the concept has undergone intensive review from a safety standpoint. These reviews have established that malfunction of an entrance or exit valve is of greater concern than any other realistic failure mode. With the exit valve operated in the preferred manner, i.e., as a flapper valve requiring no external command or power supply, and configured as it is to move out of the way in the unlikely event of physical contact with the vehicle, it has been concluded that the exit valve is not a serious hazard.

The entrance valve is of greater concern. Failure to open, of course, is no problem from a safety standpoint: The only consequence would be that the vehicle is immobile in the station. However, if the vehicle should get underway in the normal manner and then the entrance valve should fail to close properly, the consequence could be that the vehicle would arrive at the destination with excessive speed, or perhaps fail to reach the destination.

SUMMARY OF THE INVENTION

Among the several objects of this invention may be noted the provision of an improved high-speed ground transportation system of the class above-described in which the vehicle is brought to a stop in the station at the end of the trip in an emergency situation where the entrance valve has failed to close, or closes too early, or closes only part way; the provision of such a system which assures that the entire duct is quickly restored to normal atmospheric pressure under the emergency circumstances, thereby eliminating concern about pressure integrity of the vehicle and permitting instant egress of passengers after the vehicle has stopped; the provision of a system as above-described which greatly reduces the likelihood that the vehicle will stop midway between the stations, so as to eliminate any necessity for central elevator shafts, particularly when such shafts would be impractical due to the duct passing under a bay or river, for example; the provision of such a system which avoids inconvenience and worry on the part of the passenger, in that it minimizes the likelihood of stoppage at a remote and unfamiliar point; and the provision of a system of the class above-described which avoids rapid pneumatic deceleration as the vehicle enters the station, thereby permitting mechanical braking means to be utilized without excessive braking rate.

In general, a high-speed ground transportation system of this invention comprises a duct and a vehicle adapted for propulsion as a free piston through the duct by differential air pressure on the ends of the vehicle. A valve is provided for the duct at the entrance end of the duct adapted to close at a carefully determined time after the rearward end of the vehicle has passed thereby to trap a slug of propulsive air behind the vehicle in the duct, and a valve is provided for the duct at the exit end of the duct adapted to open as the vehicle approaches the exit valve for exit of the vehicle past the exit valve to a station. The emergency feature of the system comprises means for comparing the actual position of the entrance valve with the normal behavior in response to a closing command, and means for calculating a time at which to open the exit valve if it is determined that the entrance valve has failed to close as intended. In addition, it comprises means for opening the exit valve to flood the duct ahead of the vehicle with air, and to do so at a time calculated to dissipate the proper amount of energy to cause the vehicle to be in the next station when it stops. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
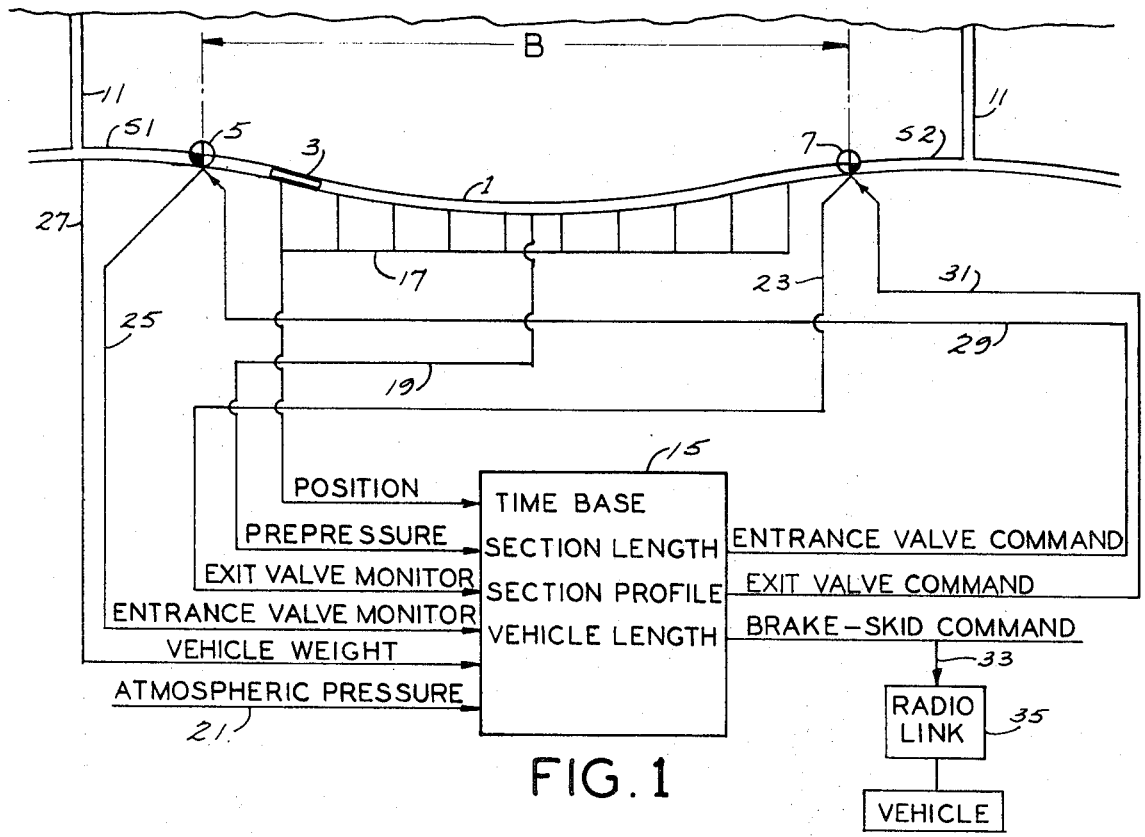
FIG. 1 is a diagrammatic view of a portion of a high-speed ground transportation system showing an arrangement of this invention for bringing the vehicle to an emergency stop.

Referring to FIG. 1 of the drawings, there is indicated at 1 a subterranean tube or duct extending from a station S1 to a station S2 along the route of a transportation system. At 3 is indicated a vehicle adapted for propulsion as a free piston through the duct by differential pressure of air between the rear and the front of the vehicle. Entrance of the vehicle from station S1 to the duct is via an entrance valve 5 at the entrance end of the duct. Exit of the vehicle from the duct to station S2 is via an exit valve 7 at the exit end of the duct. The valves 5 and 7 may be of the type shown in application Ser. No. 710,582, filed Mar. 5, 1968, by Lawrence K. Edwards and Bruce E. Skov, entitled High-Speed Ground Transportation System (attorneys' file 7313). It will be understood that additional sections of the duct are provided as may be required by the total length of the transportation system.

Valves 5 and 7, when closed, block off a section B of the duct from valve to valve between stations S1 and S2. Provision is made for evacuating this section of the duct down to low pressure (of the order of 1 p.s.i., for example), as by means of an evacuating pump (not shown). Each station is adapted for entry or exhaust of atmospheric air via a shaft 11.

A trip of the vehicle 1 from the departure station S1 to the destination station S2 is initiated by opening the entrance valve 5, the exit valve 7 being closed. With section B of the duct having been previously evacuated down to low pressure (of the order of 1 p.s.i., for example), atmospheric pressure in station S1 acting on the rear of the vehicle propels the vehicle forward into section B. When the rearward end of the vehicle has passed by the entrance valve 5 a suitable distance, the entrance valve 5 is normally closed, thereby trapping a slug of propulsive air behind the vehicle. This slug of air expands causing the vehicle to accelerate through section B. FIG. 1 shows the vehicle traveling through the section, under acceleration due to expansion by the trapped slug of air. The vehicle continues to accelerate, at a decreasing rate, until it reaches a point where the pressure ahead of the vehicle is approximately equal to the pressure behind the vehicle. The vehicle then begins to decelerate while it compresses the air trapped between its forward end and the closed exit valve 7. When pressure forward of the vehicle exceeds atmospheric pressure by a small increment, valve 7 opens and the train continues into the station S2, thereby completing its trip from station S1 to station S2. When the rearward end of the train passes the exit valve 7, this valve closes to preserve the vacuum in section B of the duct.

For large and heavy trains, as is required in an urban mass transportation system, it is desirable to utilize an additional propulsive power source, namely, gravity, by sloping the duct downward from the stations as shown in FIG. 1. That is, the duct descends to a greater depth between stations than at the stations in an arc of predetermined contour or profile. With this arrangement, gravity is utilized to increase the acceleration of the vehicle leaving station S1 and to increase the deceleration of the vehicle approaching station S2, interchanging potential and kinetic energy with the same high efficiency as a pendulum. Thus, as the vehicle traverses the downward slope of the arc it is accelerated both by gravity and by the differential air pressure on its front and rear. Similarly, as the vehicle traverses the upward slope of the arc it is decelerated by gravity and compression of air ahead of it, with the loss in energy due to gravity being equal to the gain in energy attained on the down slope, so that the vehicle comes to a natural stop in the station provided the pneumatic and other energy components are in balance. The kinetic energy of the vehicle on a normal trip between stations S1 and S2 due to both pneumatics and gravity is shown by curve A in FIG. 2.

As shown in my application Ser. No. 473,724, the vehicle is a wheeled vehicle riding on rails on the floor of the duct. In addition, the train is equipped with brakes for use in various emergencies. These brakes may, for example, be brake-skids which are applied to the rails upon retraction of the wheels of the vehicle.

In accordance with the present invention, provision is made for bringing the vehicle 3 to a stop in the station S2 in the event that the entrance valve 5 fails to close, or closes too early, or closes only partially. That is, if the entrance valve fails to close or closes only partway, a larger than normal slug of propulsive air will be admitted behind the vehicle thereby accelerating the vehicle to a higher velocity than normal and tending to cause it to enter station S2 with excessive velocity. If the entrance valve 5 closes at a time earlier than was intended, the slug of propulsive air trapped between the rearward end of the vehicle and the entrance valve will have insufficient energy to propel the vehicle into the station S2 and the vehicle would stop somewhere in the duct between the stations S1 and S2. The apparatus and methods of the present invention insure that the vehicle will always stop in the station S2 even if the entrance valve 5 fails to function properly in its primary mode of operation. Briefly, this is accomplished by sensing the condition or instantaneous position of the entrance valve to determine whether this valve has closed at the proper time. If the entrance valve has failed to close the emergency routine is initiated. Under this routine the entry-valve closure command is reversed and computations are made as the vehicle gathers speed to determine when to open the exit valve 7. At this computed time, the exit valve is opened to flood the duct ahead of the vehicle with air and thereby cause the proper amount of energy loss to stop the vehicle in the station S2.

Another potential malfunction of the entry valve is premature closure; if this should happen, the emergency routine must command the entry valve to reopen, and the remainder of the emergency sequence would be substantially as just described.

Still another failure mode that must be provided for is a partial closure of the entry valve; in this event, too, the emergency routine must command the entry valve to reopen and then continue as described.

Figure 3A:
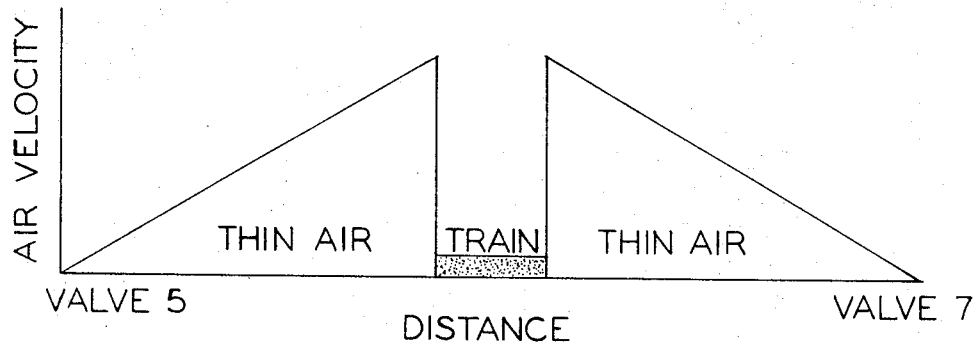
FIG. 3A is a graphical representation of conditions during a normal trip of the vehicle, showing the velocity profile of air in the tube at an instant when the vehicle is in the central portion of the tube.
Figure 3B:
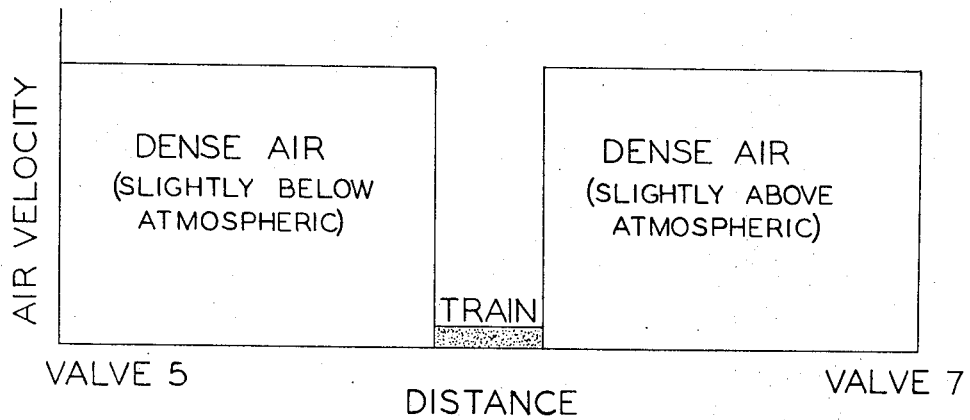
FIG. 3B is a graphical representation of conditions in an emergency mode, showing the velocity profile of air in the tube at an instant when the vehicle is in the central portion of the tube.

At first glance it might seem that, once the train has received an initial input of energy from a normal pneumatic start, it would be impossible to cause the train to come to a stop (or near stop) in the next station simply by keeping the pressure behind the train at atmospheric pressure and by quickly raising the pressure in front of the train to atmospheric. In other words, one might assume (and some analysts have erroneously calculated) that, with pressure nominally equalized for the remainder of the trip, the train would never encounter a pneumatic retarding force sufficient to offset the initial pneumatic input. There are two reasons why this is not so, and herein lies a key feature of the present invention. First, in the emergency mode, the air density both forward and aft of the train is much higher than the normal (evacuated) conditions for the highest-speed portion of the trip. This alone would greatly increase the force necessary to move air along the duct at high speed. Second, in the emergency mode, all the air in the duct must move at approximately the train's velocity as shown in FIG. 3B whereas in the normal trip the air velocity along the duct varies from zero to the speed of the train as shown in FIG. 3A.

Moving so much dense air at high speed (and the gravity profile assures that the train must accelerate to high speed regardless of pneumatic considerations) necessarily entails high pneumatic losses, which effectively appear as reduced pressure against the aft end of the train and increased pressure against the front end of the train. Consequently, the train experiences a powerful retarding force in the emergency mode, even though it has air at nominally atmospheric pressure and density both front and rear. This retarding force is so great that it must not be put into effect too soon, or the train would not reach the second station before stopping. The task of the emergency computer is to predict when these abnormal factors will combine to cause the desired energy loss.

It is recognized that such prediction is subject to some error, and this is why the brake-skids are employed to complete the emergency stop. The computer's determination of when to open the exit valve is biased to account for the range of error on a probabilistic basis (such as 99 percent probability), and the brake skids are used to dissipate the ream remaining energy. The computation must also take into account such practical factors as the finite amount of time (typically of the order of 10 seconds) necessary for atmospheric air to traverse the duct from the exit valve to the front of the train.

As shown in FIG. 1, a plurality of sensors and data links are provided along the transportation system for generating and transmitting signals of a variable nature to an emergency computer 15 for calculating, in the event that the entrance valve fails to close properly, a time at which to open the exit valve 7 for bringing the vehicle to a stop in the station S2. The sensors include a plurality of position sensors and data links 17 spaced at intervals along the duct 1 between the stations S1 and S2 for generating signals relative to the position of the vehicle in the duct These signals may be used in conjunction with other data to determine the velocity and acceleration of the vehicle at any point during its trip between the stations. A pressure sensor and data link 19 is provided in the duct between the stations S1 and S2 for sensing the evacuated pressure in the duct, and an atmospheric pressure sensor and data link 21 is provided, for determining the pressure differential on the front and rear of the vehicle. Exit and entrance valve monitors 23 and 25 are respectively provided for the exit valve 7 and entrance valve 5 for generating signals corresponding to the positions of these valves, i.e., whether the entrance and exit valves are open, partially open, or closed. Vehicle weight is also determined by a sensor 27 while the vehicle is in the station S1. This is ascertained at the beginning of each trip of the vehicle since the vehicle's weight will vary with the number of passengers on board. For example, the train may be statically weighed while it is at rest in the station S1. This can be accomplished by measuring either the deflection of the tube suspension springs or the hydraulic pressure in the wheel retractors (described in my U.S. Pat. application Ser. No. 473,724 ) while the vehicle is in the station S1. Alternatively, the weight of the vehicle may be ascertained by measuring the vehicle acceleration as it leaves the station with known forces acting upon it. Acceleration can be measured with either an onboard accelerometer or derived from position and time information supplied to the computer.

The computer 15 is preprogrammed with certain fixed or nonvarying information such as a standard time base, the length of the duct between stations S1 and S2, the duct contour or profile and the length of the vehicle. With this information and the variable information provided by the above-described sensors and data links, the computer provides output commands or signals 29, 31 and 33 for respectively commanding the entrance valve to open, the exit valve to open, and the vehicle brake skids to engage, the latter being actuated through a radio link 35 with the vehicle.

Figure 2:
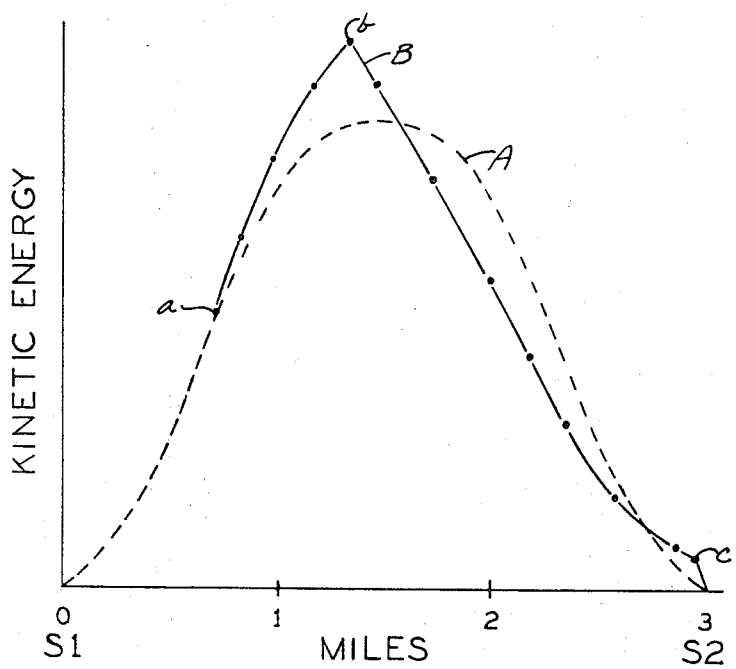
FIG. 2 is a graphical representation of the kinetic energy of a vehicle versus distance under normal and emergency conditions.

Operation is as follows:

The operation of the emergency stop system is described for a 3 mile trip between stations S1 and S2, as depicted by the graph of FIG. 2. A vehicle length of 2210 feet and a vehicle weight of 1,535,000 pounds (five thousand passengers) are used as an example. Thus, the computer will be preprogrammed for a section length of 3 miles, a vehicle length of 2210 feet, a weight of 1,535,000 pounds, and the profile of the section of the duct between the stations S1 and S2. The weight of the train is ascertained by one of the above-described methods and this information, together with the atmospheric and evacuated duct pressures, are transmitted to the computer via the data links 27, 21 and 19. To begin the trip of the vehicle between stations S1 and S2, the entrance valve 5 is opened. As a result of opening this valve, the forward end of the vehicle in station S1 is exposed to the low pressure of the duct. Since the rearward end of the vehicle is exposed to atmospheric pressure, the vehicle is propelled past the valve 5 and into section B, accelerating and increasing its kinetic energy as it travels. Valve 5 is normally maintained open for a suitable interval after the rearward end of the vehicle has passed thereby, to permit atmospheric air to enter section B behind the vehicle via the station S1. Then, after the vehicle has progressed past the valve 5 for some distance as determined by the system's normal controls, valve 5 is closed. The effect of this is to trap a measured slug of atmospheric air (at atmospheric pressure of some 14.7 p.s.i.) between valve 5 and the rear of the vehicle. The vehicle is further accelerated by this expanding slug of propulsive air and by gravity due to the initial downward slope of the duct. These combined propulsive energies are of such a magnitude as to bring the vehicle to a stop in station S2. The kinetic energy of the vehicle between stations S and S2 under normal operating conditions is represented by the curve A in FIG. 2, with point $a$ representing the point at which the entrance valve is normally closed.

If the entrance valve 5 fails to close properly, i.e., if it remains open or closes too early or closes only part way, the volume of the slug of propulsive air admitted behind the vehicle will either be larger than normal thereby tending to cause the vehicle to enter station S2 at high velocity, or smaller than normal thereby tending to cause the vehicle to come to a stop in the duct before reaching station S2. For example, if the entrance valve fails to close, the excessive slug of propulsive air would tend to propel the vehicle through the duct at higher than normal velocities and the vehicle would enter station S2 with excessive velocity. Similarly, if the entrance valve closed earlier than normal, the insufficient slug of propulsive air would propel the vehicle through the duct at lower than normal velocities and the vehicle would have insufficient energy to reach station S2.

In accordance with the present invention, operation of the entrance valve 5 is always monitored by the sensor 25 and a signal, indicative of this operation, is transmitted to the computer 15. If operation is improper, the computer recognizes this and initiates the emergency routine, which will now be described in detail. First, the computer transmits a signal via entrance valve command 29 to hold the entrance valve open (or in the case of premature closure, to reopen it). Then the computer calculates the present kinetic energy of the train and projects the kinetic energy relationships that would ensue if the exit valve were immediately opened. For reasons already discussed, the projected energy loss would be too great at the time of the first computation, so that the computer repeats the process at the rate of several cycles per second. When the projected energy loss is what it should be, a second signal is transmitted via exit valve command 31 to open the exit valve and repressurize the duct. Again the computer monitors the actual velocity of the vehicle as it approaches and enters the station, making repeated calculations of the energy to be lost upon engagement of the brake-skids. When the predicted loss equals the desired loss, a third signal is transmitted via brake command 33 and radio link 35 to actuate the vehicle's brakes. As shown by line B in FIG. 2, for the stated example the exit valve is opened at point $b$ when the vehicle is approximately 1.4 miles from the station S1 (approximately 50 seconds after departure from station S1) and the brakes are applied at point $c$ when the vehicle is entering station S2 and its actual velocity is observed.

It will be understood that the time at which the exit valve is opened after the malfunction occurs is dependent upon the weight of the vehicle (the number of passengers on board), atmospheric and duct pressures, and the duct contour and the duct and vehicle lengths. Thus, if the weight of the vehicle is less than that used in the above example, or if the duct length between stations is shorter than the 3 mile example, the exit valve will be opened somewhat sooner than in this example.

It is possible that, especially on the longer trips (e.g., upward of 3 miles in length), excessive delay would be incurred while air traverses the duct from the exit valve to the train. In this event it is desirable to place additional emergency repressurization valves at strategic points along the duct, which valves can draw atmospheric air from the surrounding tunnel, or from an auxiliary duct running alongside the main duct, or from a special vent to the surface. Examples of such additional valves are shown in my copending applications 473,724 and 473,726. These additional valves would be opened by the same computer command that opens the exit valve, as already described, and my may have the further characteristic that, when opened, they admit air freely but inhibit outflow of air as the train draws closer to them.

Thus, the present invention provides apparatus and methods for bringing a vehicle, in a high-speed ground transportation system, to an emergency stop in the destination station in the event that the entrance valve malfunctions in any of the three modes that have been identified to date, i.e., premature closure, failure to close, or partial closure. This system also assures that the entire duct is returned to nominally atmospheric pressure as soon as an emergency is recognized, thereby minimizing concern about pressure integrity of the vehicle and assuring that passengers may in any event depart the vehicle as soon as it has stopped. Further, the application of the brake-skids is accomplished at a time when pneumatic deceleration is very low, thereby avoiding excessive deceleration rates.

In view of the above, it will be seen that the several objects of the invention are achieved and other advantageous results attained.

As various changes would could be made in the above constructions and methods without departing from the scope of the invention, it is intended that all matter contained in the above description or shown in the accompanying drawings shall be interpreted as illustrative and not in a limiting sense.

I claim:

1. A high-speed ground transportation system comprising a duct, a vehicle adapted for propulsion as a free piston through the duct by differential air pressure on the ends of the vehicle, a valve for the duct at the entrance end of the duct adapted to close after the rearward end of the vehicle has passed thereby to trap a slug of propulsive air behind the vehicle in the duct, a valve for the duct at the exit end of the duct adapted to open as the vehicle approaches the exit valve for exit of the vehicle past the exit valve to a station, means responsive to the operation of the entrance valve for generating a signal indicative of the instantaneous position of said entrance valve, means responsive to said signal for calculating a time at which to admit atmospheric air into the duct ahead of the vehicle when said signal indicates an improper position of said entrance valve, and means for admitting said air at said time to flood the duct ahead of the vehicle with air to decelerate the vehicle and bring the vehicle to a stop in said station.

2. A high-speed ground transportation system as set forth in claim 1 wherein said means for admitting air is the exit valve of the duct and said calculating means is a computer preprogrammed in with the length and contour of the duct between the entrance and exit valves.

3. A high-speed ground transportation system as set forth in claim 2 further comprising means responsive to the weight of the vehicle for generating a signal which is a function thereof, said computer being responsive to a composite of said signals for providing an output signal indicative of said time, said exit valve opening means being responsive to said output signal.

4. A high-speed ground transportation system as set forth in claim 3 further comprising means responsive to atmospheric and duct pressures for generating signals which are functions thereof, said computer being responsive to a composite of said signals for providing said output signal.

5. A high-speed ground transportation system as set forth in claim 2 further comprising means responsive to the positions of the vehicle in the duct as it traverses the duct for generating signals which are functions thereof, said computer being responsive to a composite of said signals for providing an output signal indicative of said time, said exit valve opening means being responsive to said output signal.

6. A high-speed ground transportation system as set forth in claim 1 wherein said time is determined to bring the vehicle into the station at a moderate velocity, and further comprising braking means responsive to a second output signal from said calculating means for precisely controlling the stopping location of the vehicle in the station.

7 In a high-speed ground transportation system having a duct, a vehicle adapted for propulsion as a free piston through the duct by differential air pressure on the ends of the vehicle, a valve for the duct at the entrance end of the duct adapted to close after the rearward end of the vehicle has passed thereby to trap a slug of propulsive air behind the vehicle in the duct, and a valve for the duct at the exit end of the duct adapted to open as the vehicle approaches the exit valve for exit of the vehicle past the exit valve to a station; the method of bringing the vehicle to an emergency stop in the station upon failure of the entrance valve to close properly, comprising sensing any improper closing of the entrance valve and maintaining this valve open throughout the trip of the vehicle, and thereafter, at a time determined to bring the vehicle to a stop in the station, admitting atmospheric air into the duct ahead of the vehicle to decelerate the vehicle.

8. The method of claim 7 wherein said time is determined by computer means preprogrammed with the length and contour of the duct between the entrance and exit valves, and further comprising generating a signal which is a function of the closing of said entrance valve, and sensing the weight of the vehicle and generating a signal which is a function thereof, said computer means being responsive to a composite of said signals for providing an output signal indicative of said time for admitting atmospheric air ahead of the vehicle.

9. The method of claim 8 further comprising sensing atmospheric and duct pressures and generating signals which are functions thereof, said computer means being responsive to a composite of said signals for providing said output signal.

10. The method of claim 7 wherein said time is determined by computer means preprogrammed with the length and contour of the duct between the entrance and exit valves, and further comprising generating a signal which a function of the closing of said entrance valve, and sensing the positions of the vehicle in the duct as it traverses the duct for generating signals which are functions thereof, said computer means being responsive to a composite of said signals for providing an output signal indicative of said time for admitting atmospheric air ahead of the vehicle.